United States Patent [19]

Parry et al.

[11] Patent Number: 4,613,485
[45] Date of Patent: Sep. 23, 1986

[54] PNICTIDE TRAP FOR VACUUM SYSTEMS

[75] Inventors: Robert W. Parry, Salt Lake City, Utah; John A. Baumann, Ossining; Rozalie Schachter, Flushing, both of N.Y.

[73] Assignee: Stauffer Chemical Company, Westpoint, Conn.

[21] Appl. No.: 581,101

[22] Filed: Feb. 17, 1984

[51] Int. Cl.$^4$ ............................................. F01N 3/10
[52] U.S. Cl. .................................... 422/173; 422/187; 422/202; 422/244; 118/723
[58] Field of Search ............... 422/173, 174, 187, 199, 422/202, 244; 118/723

[56] References Cited

U.S. PATENT DOCUMENTS

| Re. 25,858 | 9/1965 | Matvay | 422/174 |
|---|---|---|---|
| 2,203,554 | 6/1940 | Uhri, Jr. et al. | 422/174 |
| 3,024,009 | 3/1962 | Booth, Jr. et al. | 422/244 |
| 3,287,434 | 11/1966 | Stanton et al. | 422/199 |
| 3,617,226 | 11/1971 | List et al. | 422/202 |
| 4,357,303 | 11/1982 | Hodson | 422/187 |
| 4,508,931 | 4/1985 | Michel et al. | 136/255 |

FOREIGN PATENT DOCUMENTS

| 786008 | 10/1935 | France | 422/199 |
|---|---|---|---|
| 322379 | 11/1972 | U.S.S.R. | 422/199 |

OTHER PUBLICATIONS

Melville and Gray, The Polymerisation of Phosphorus, Trans. Faraday Sa. 32, 271 (1936) pp. 271-285.

Primary Examiner—David L. Lacey
Attorney, Agent, or Firm—F. Eugene Davis IV

[57] ABSTRACT

The present invention provides a trap for a vapor species, particularly a pnictide$_4$ vapor species, for a vacuum system of the type including a vacuum chamber communicating with a forepump through a vacuum line. The trap may be positioned within the vacuum chamber itself, or in the alternative, the trap may be located between the vacuum chamber and the forepump. The trap includes a housing for a cracker, which may be a heated filament or a plasma, which cracks the pnictide vapor species into pnictide$_2$. The walls of the housing are cooled so that the trapped pnictide species readily forms a film and adheres to the walls of the housing. The pnictide$_4$ vapor species, which may be harmful to the operation of a forepump, is prevented from entering the forepump. A removable sleeve can be positioned in the housing so that the cracked species adheres to it. The sleeve may be removed from the housing for maintenance and replacement purposes. When the trap is located within the vacuum chamber itself, it also functions to reduce background pnictide$_4$ pressure in that chamber.

7 Claims, 3 Drawing Figures

PNICTIDE TRAP FOR VACUUM SYSTEMS

RELATED APPLICATIONS

This application is related to the following co-pending applications, assigned to the same assignee as this application. These applications are incorporated herein by reference. U.S. patent application Entitled CATENATED SEMICONDUCTOR MATERIALS OF PHOSPHORUS, METHODS AND APPARATUS FOR PREPARING AND DEVICES USING THEM, Ser. No. 335,706, filed Dec. 30, 1981, now abandoned; MONOCLINIC PHOSPHORUS FORMED FROM VAPOR IN THE PRESENCE OF AN ALKALI METAL, Ser. No. 419,537, filed Sept. 17, 1982; CATENATED PHOSPHORUS MATERIALS, THEIR PREPARATION AND USE, AND SEMICONDUCTOR AND OTHER DEVICES EMPLOYING THEM, Ser. No. 442,208, filed Nov. 16, 1982, which is a Continuation-in-Part of Ser. Nos. 335,706 and 419,537; VACUUM EVAPORATED FILMS OF CATENATED PHOSPHORUS MATERIAL, Ser. No. 509,159, filed June 29, 1983; GRAPHITE INTERCALATED ALKALI METAL VAPOR SOURCES, Ser. No. 509,157, filed June 29, 1983; SPUTTERED SEMICONDUCTING FILMS OF CATENATED PHOSPHORUS MATERIAL AND DEVICES FORMED THEREFROM, Ser. No. 509,175, filed June 29, 1983; MIS DEVICES EMPLOYING ELEMENTAL PNICTIDE OR POLYPHOSPHIDE INSULATING LAYERS, Ser. No. 509,210, June 29, 1983; and, LIQUID PHASE GROWTH OF CRYSTALLINE POLYPHOSPHIDE, Ser. No. 509,158, filed June 29, 1983; also, the applications of David G. Brock and John A. Baumann for THERMAL CRACKERS FOR FORMING PNICTIDE FILMS IN HIGH VACUUM PROCESSES Ser. No. 581,139, filed 2/17/84; Diego J. Olego, John A. Baumann, Paul M. Raccah, Rozalie Schachter, Harvey B. Serreze and William E. Spicer for PASSIVATION AND INSULATION OF III-V DEVICES WITH PNICTIDES, PARTICULARLY AMORPHOUS PNICTIDES HAVING A LAYER-LIKE STRUCTURE Ser. No. 581,115, filed 2/17/84; Diego J. Olego for PNICTIDE BARRIERS IN QUANTUM WELL DEVICES Ser. No. 581,140, filed 2/17/84; Diego J. Olego for USE OF PNICTIDE FILMS FOR WAVE-GUIDING IN OPTO-ELECTRONIC DEVICES Ser. No. 581,171, filed 2/17/84; Rozalie Schachter and Marcello Viscogliosi for VACUUM DEPOSITION PROCESSES EMPLOYING A CONTINUOUS PNICTIDE DELIVERY SYSTEM, PARTICULARLY SPUTTERING Ser. No. 581,103, filed 2/17/84; Mark A. Kuck and Susan W. Gersten for CONTINUOUS PNICTIDE SOURCE AND DELIVERY SYSTEM FOR FILM DEPOSITION, PARTICULARLY BY CHEMICAL VAPOR DEPOSITION Ser. No. 581,102, filed 2/17/84; Mark A. Kuck and Susan W. Gersten for METHOD OF PREPARING HIGH PURITY WHITE PHOSPHORUS Ser. No. 581,105, filed 2/17/84; and, Mark A. Kuck, Susan W. Gersten, John A. Baumann and Paul M. Raccah for HIGH VACUUM DEPOSITION PROCESSES EMPLOYING A CONTINUOUS PNICTIDE DELIVERY SYSTEM Ser. No. 581,104, filed 2/17/84.

TECHNICAL FIELD

This invention relates to a pnictide trap for vacuum systems; and to pnictide crackers.

BACKGROUND ART

Phosphorus and other pnictides produce deleterious effects when passed through the forepumps of vacuum systems. They also collect on the walls and mechanisms in vacuum chambers and mechanisms periodically have to be disassembled for cleaning. Re-evaporation of pnictides also increase the background pressure of pnictide$_4$ species which is undesirable in certain processes. An effective trapping system is needed.

DISCLOSURE OF THE INVENTION

A pnictide trap 38 according to the invention comprises a chilled cylindrical sleeve 20 (FIG. 2) and a heated filament 22 or a plasma, (such as that provided by a glow discharge) centrally located within the sleeve 20. $P_4$ species enters the sleeve 20 through opening 24 therein. $P_4$ is cracked to $P_2$ by the heated filament 22 which is heated preferably to above 1000° C. $P_2$ which has a high sticking coefficient is converted to a phosphorus film on the inner wall 26 of sleeve 20.

The sleeve 20 may be removed from the system by removing clamps 29. First the cover plate 28 and filament 22 are removed, and then the sleeve 20. It may be cleaned or replaced by a new clean sleeve.

The pnictide trap 38 is shown in a vacuum line in FIG. 1. Another pnictide trap 60 can also be located in the vacuum chamber 32 to reduce extraneous pnictide deposits therein.

OBJECTS OF THE INVENTION

It is therefore an object of the invention to provide a vacuum system trap.

Another object of the invention is to provide such a trap for pnictides.

Other objects of the invention will in part be obvious and will in part appear hereinafter.

The invention accordingly comprises the several steps and the relation of one or more such steps with respect to each of the others, and the apparatus embodying features of construction, selection of elements and arrangements of parts which are adapted to effect such steps, all as exemplified in the following detailed disclosure. The scope of the invention is indicated in the claims.

BRIEF DESCRIPTION OF THE DRAWINGS

For a fuller understanding of the nature and objects of the invention, reference should be made to the following detailed description taken in connection with the accompanying drawings in which.

The same reference characters refer to the same elements throughout the several views of the drawings.

BEST MODE FOR CARRYING OUT THE INVENTION

Figure 1:
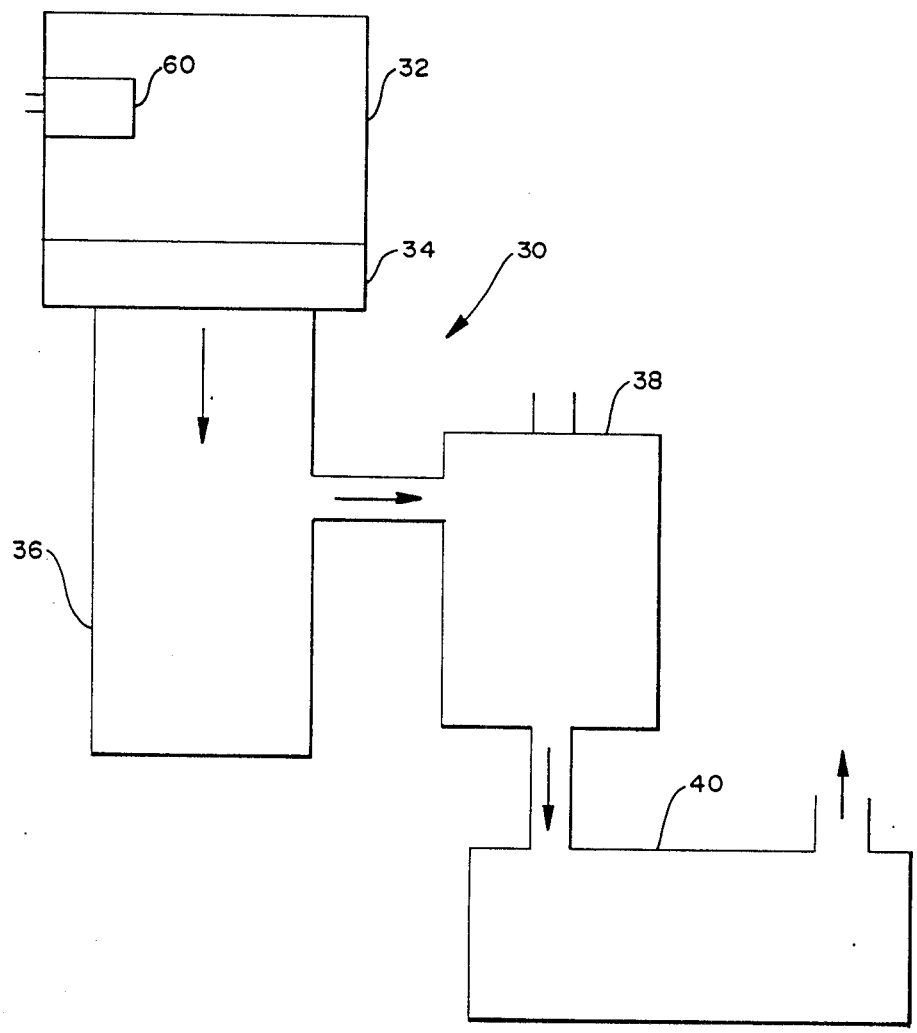
FIG. 1 is a diagram of a vacuum system employing a pnictide trap according to the invention.

Now, referring to FIG. 1, a vacuum system 30, according to the invention, comprises a vacuum chamber 32 and a high vacuum valve 34, diffusion pump 36, pnictide trap 38, and a mechanical forepump 40. Gases are exhausted from the vacuum system in the direction of the arrows.

Figure 2:
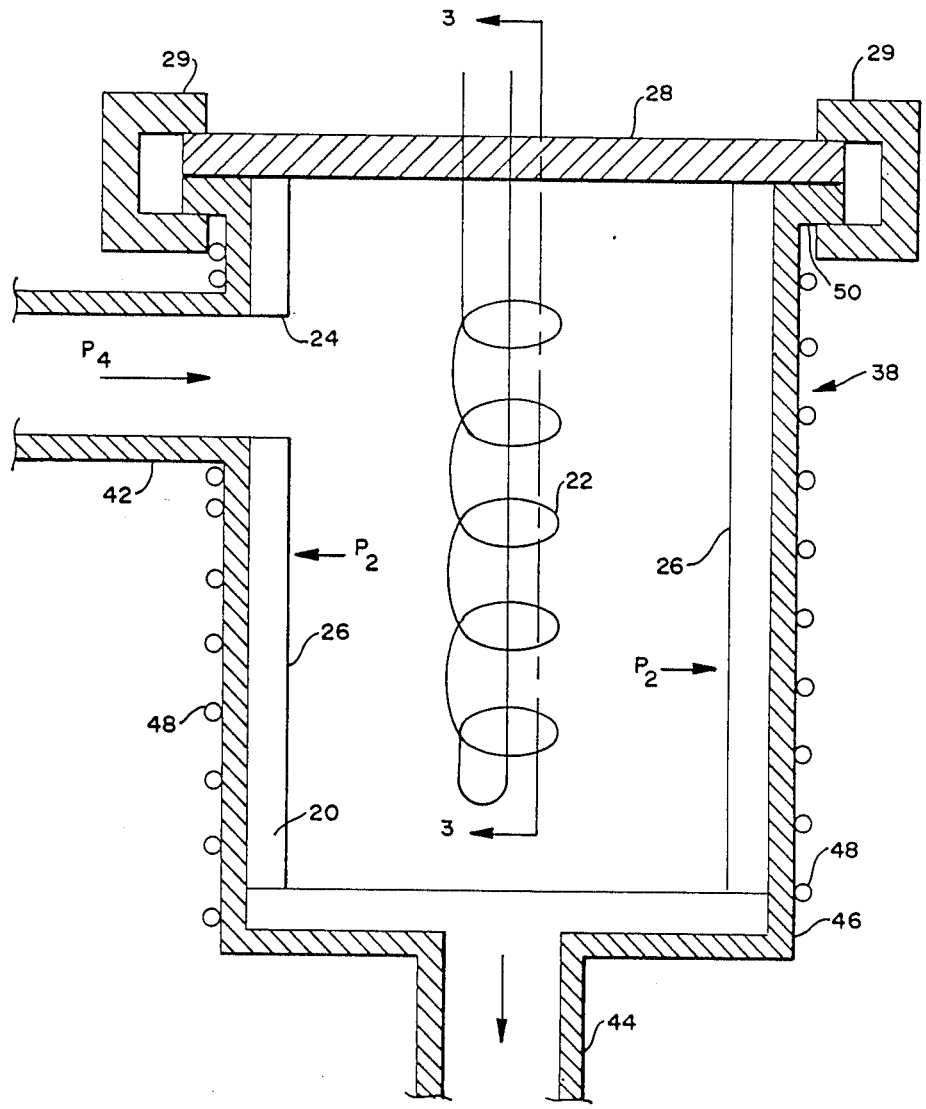
FIG. 2 is a cross-sectional view of the pnictide trap of the vacuum system of FIG. 1; and, FIG. 3 is a partial cross-sectional view of the removable and replaceable portion of the pnictide trap of FIG. 2.

Now, referring to FIG. 2, the pnictide trap of the invention is connected between outlet pipe 42, from the diffusion pump 36 (FIG. 1), and to the supply pipe 44 to the mechanical forepump 40 (FIG. 1).

The pnictide trap 38 comprises a cylindrical body 46 of stainless steel, for example, cooled by water cooling lines 48 in intimate contact therewith.

Cylindrical body 46 is provided with an annular collar 50 surrounding an opening at the top. A removable cylindrical sleeve 20 fits in this opening. Sleeve 20 fits in heat conductive contact with body 46, so that it is cooled by the water cooling lines 48.

The sleeve 20 is provided with an opening 24 to the pipe 42 through which $P_4$ species enter into the trap 38. A heated filament 22 is mounted to the cover plate 28 by means of an appropriate feed throughs (not shown). The filament is preferably heated to above 1000° C. to cause cracking of a significant portion of the $P_4$ species to $P_2$ which then sticks to the inner wall 26 of the sleeve 20 in the form of a phosphorus film.

For more information concerning the operation of the cracker 22, see the above-identified pending application of John A. Baumann and David G. Brock entitled VACUUM EVAPORATED FILMS OF CATENATED PHOSPHORUS MATERIAL, Ser. No. 509,159, filed June 29, 1983. That application is incorporated by reference herein.

Figure 3:
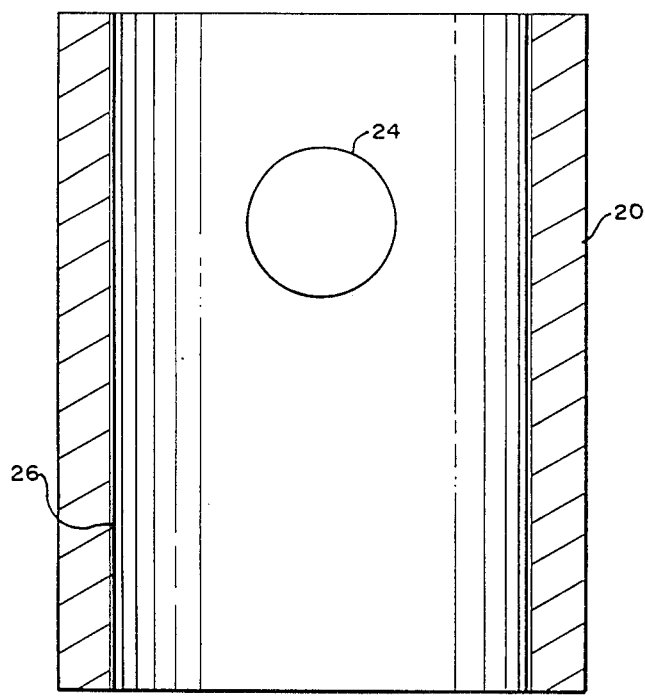

As shown in FIG. 2, the coverplate 28 may be removed together with the filament 22 by removing the clamps 29. The cylindrical sleeve 20 (FIG. 3) may then be removed and replaced, after cleaning or by a new sleeve.

The trap comprising the sleeve 20 and the filament 22 may be placed in the vacuum chamber 32 as at 60 to trap pnictides therein. This will reduce the buildup of pnictide coating inside the chamber 32 and lengthen its usage time between cleanings and reduce the background $pnictide_4$ pressure when required.

The invention is useful for pnictides whose $pnictide_4$ species has a low sticking coefficient and whose cracked species, such as $pnictide_2$, have a high sticking coefficient. The invention may be also applied to other gases in vacuum systems which have a low sticking coefficient until cracked.

It is particularly important to trap pnictides before they get into the forepump as they are very deleterious to its operation.

Any suitable cracker or cracking method may be employed, such as a plasma which may be provided by a glow discharge. The input pipe 42 directs the uncracked species to the cracker 22. Having the exit pipe 44 orthogonal to inlet pipe 42 insures that more of the cracked species is directed to the walls and that most of the uncracked species encounter the cracker before it can exit through pipe 44.

It will thus be seen that the object set forth above among those made apparent by the preceding description, are efficiently attained and since certain changes may be made in the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a vacuum system including a vacuum chamber coupled in fluid flow relationship to a forepump through a vacuum line, the improvement comprising a trap for $pnictide_4$ vapor species including:
   a trap housing disposed in said vacuum line before said forepump,
   gas inlet means coupled to said housing for transporting a $pnictide_4$ vapor species thereto,
   gas outlet means coupled to said housing,
   cracker means disposed in said housing for cracking said $pnictide_4$ vapor species, and
   means for cooling at least one wall of said trap housing to a sufficient temperature at which said cracked pnictide species forms a film on said at least one wall.

2. In a vacuum system including a vacuum chamber coupled in fluid flow relationship to a forepump, the improvement comprising a trap for $pnictide_4$ vapor species including:
   a trap housing disposed within said vacuum chamber,
   gas inlet means coupled to said trap housing for transporting a $pnictide_4$ vapor species therein,
   gas outlet means coupled to said trap housing,
   cracker means disposed within said trap housing for cracking said $pnictide_4$ vapor species, and
   means for cooling at least one wall of said trap housing to a sufficient temperature at which said cracked pnictide species forms a film on said at least one wall.

3. The vacuum system of claim 1 or 2 further including a removable sleeve positioned in a said housing adjacent said at least one wall.

4. The vacuum system of claims 1 or 2 wherein said cracker means includes a heated filament.

5. The vacuum system of claims 1 or 2 wherein said cracker menas includes a plasma cracker.

6. The vacuum system of claims 1 or 2 wherein said gas inlet means is substantially orthogonal to said gas outlet means.

7. In a vacuum system including a vacuum chamber coupled in fluid flow relationship to a forepump, the improvement comprising trap means for preventing $pnictide_4$ species from entering said forepump, said trap means including:
   A. a first trap disposed within said vacuum chamber, said first trap including a housing, gas inlet means coupled to said housing for transporting said $pnictide_4$ species therein, gas outlet means coupled to said housing, a cracker within said housing for cracking said $pnictide_4$ species, and means for cooling at least one wall of said housing such that said cracked pnictide forms a film thereon, and
   B. a second trap disposed between said vacuum chamber and said forepump,
   said second trap including a second housing, second gas inlet means coupled in fluid flow relationship to said gas outlet means of said first housing and to said second housing for transporting pnictide$_4$ species therein, second gas outlet means coupled to said second housing, a second cracker within said second housing for cracking said pnictide$_4$ species, and second means for cooling at least one wall of said second housing such that said cracked pnictide forms a film thereon.

* * * * *